No. 647,916. Patented Apr. 17, 1900.
L. P. DESTRIBATS.
RUBBER PACKING.
(Application filed Nov. 27, 1899.)
(No Model.)

Witnesses
Roy K. Hill.
Annie J. Dailey.

Inventor
Louis P. Destribats.
By Crossley & Davis.
Attorneys:

UNITED STATES PATENT OFFICE.

LOUIS P. DESTRIBATS, OF WATERTOWN, MASSACHUSETTS, ASSIGNOR OF ONE-HALF TO HERBERT N. WAYNE, OF NEWTON, MASSACHUSETTS.

RUBBER PACKING.

SPECIFICATION forming part of Letters Patent No. 647,916, dated April 17, 1900.

Application filed November 27, 1899. Serial No. 738,446. (No model.)

*To all whom it may concern:*

Be it known that I, LOUIS P. DESTRIBATS, of Watertown, in the county of Middlesex and State of Massachusetts, have invented certain new and useful Improvements in Rubber Packings, of which the following is a description sufficiently full, clear, and exact to enable those skilled in the art to which it appertains or with which it is most nearly connected to make and use the same.

This invention has relation to what is commonly known as "rubber packing" for steam-engines and other machines; and it has for its object the provision of improvements in the structure whereby lateral pressure brought to bear upon the packing will distend it radially, and it will not be held from such distention or spreading by reason of the threads or fabric entering into the structure of the packing.

Heretofore, so far as I am informed, it has been usual to arrange the fabric or threads in the packing so that the said threads extend in a lateral and radial direction. Various forms of this arrangement have been employed, but in all they interfere with or oppose the distention or spreading of the packing as it is desired when in use. In my improvements the threads in the packing extend on diagonal lines in cross-section, so that they operate to bind the packing together and form a firm body and at the same time allow it to spread or be distended radially and be easily compacted or compressed laterally, thus subserving in the best possible manner the functions called for in a packing.

Reference is to be had to the annexed drawings and to the letters of reference marked thereon, forming a part of this specification, the same letters designating the same parts or features, as the case may be, wherever they occur.

Figure 1:
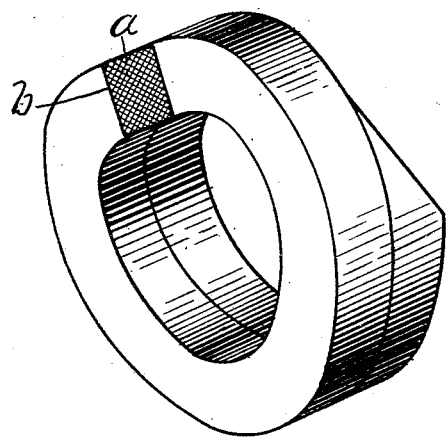
Figure 2:
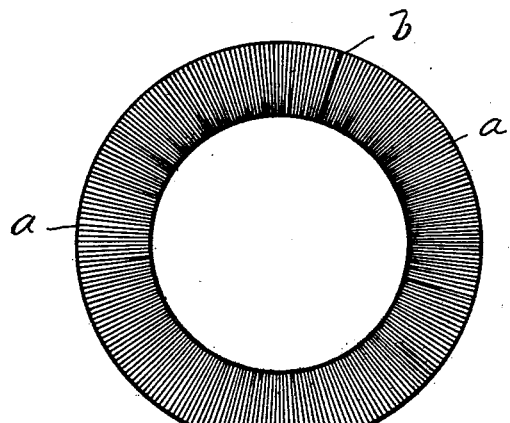

Of the drawings, Figure 1 is a perspective view of a length of my improved packing rolled into a helical coil, the exposed end of said length of packing showing its structural characteristics. Fig. 2 is a side view of a ring of the packing.

In carrrying out my invention I construct or form the packing of alternate layers of fabric and caoutchouc or rubber or incorporate in a ring or helical coil of rubber threads $a$ of suitable fiber, so as to give firmness, durability, and other requisite packing qualities to the article. In all instances in the production of my invention I arrange the threads $a$ so that they extend diagonally through the packing when the latter is viewed in cross-section, as is represented at $b$ in Fig. 1. Under this construction when the packing is compressed laterally it will spread out or distend radially without opposition or resistance from the threads $a$ and without loosening the rubber from the threads, so as to impair the efficiency of the packing, as would be the case if the threads or any of them extended in a radial or transverse direction. To explain the functions of my improved packing—in other words, when it is compressed laterally—the ends of the fibrous threads will be bent upward or downward, as the case may be, with the movement of the rubber, instead of pressing the rubber away from the threads and loosening it therefrom. Besides all this, my improved packing when compressed laterally is much more pliable or compressible than when, as under ordinary constructions, the threads extend in the direction in which the packing in use spreads or extends or in the precise direction in which it is compressed.

The packing, as already intimated, may be constructed or formed in helical coils, as shown in Fig. 1 and as is common in the construction of articles of this kind, and lengths may be cut off from this to form rings of dimensions as circumstances may call for.

Of course the packing may be made in the form of rings instead of helical coils, or it may be made in other forms, as may be desirable.

Having thus explained the nature of the invention and described a way of constructing and using the same, though without attempting to set forth all of the forms in which it may be made or all of the modes of its use, it is declared that what is claimed is—

A rubber packing, for the purposes explained, having fibrous threads incorporated therewith, all of which threads extend in a direction diagonal to the line of compression and distention of the packing and lie in planes substantially cross-sectional axially of the packing, substantially as set forth.

In testimony whereof I have signed my name to this specification, in the presence of two subscribing witnesses, this 12th day of October, A. D. 1899.

LOUIS P. DESTRIBATS.

Witnesses:
ARTHUR W. CROSSLEY,
ANNIE J. DAILEY.